United States Patent Office 3,451,224
Patented June 24, 1969

3,451,224
STOWABLE UNDERWATER MANIPULATOR
Raymond L. Colechia, Mystic, and Vincent T. Malcolm, Jr., Old Saybrook, Conn., assignors to General Dynamics Corporation, New York, N.Y., a corporation of Delaware
Filed June 20, 1967, Ser. No. 647,508
Int. Cl. B63c *11/00;* B25j *3/00;* B63g *8/00*
U.S. Cl. 61—69   4 Claims

ABSTRACT OF THE DISCLOSURE

A remotely-controlled mechanical manipulator for a submersible marine vessel in the form of a pair of articulated arm members, with associated gripping hands, connected to a common, extensible, tool-carrying T-section which is mounted on the bottom of the vessel. When not in use, or when the vessel is resting on the marine floor, the manipulator is retractable into a protective compartment.

---

The present invention relates to a mechanical manipulator for a submersible marine vessel, and more particularly pertains to a versatile manipulator apparatus of novel design for handling, operating and manipulating a large variety of tools, objects and equipment in an underwater environment.

Submarines and other deep-diving submersible marine vessels have in the past been fitted with a crude form of manipulator apparatus. The manipulator apparatus heretofore employed was typically in the form of a single projecting appendage possessing limited articulation so that the range and freedom of movement of the apparatus were highly constrained. In effect, these conventional manipulators have functioned as little more than grappling hooks, and their use has been limited accordingly to the carrying out of a single specific task, such as the retrieval of objects from the ocean floor. In today's technology, with an ever increasing use of the ocean's resources, for oil drilling, mining, salvage and exploration, the need exists for undersea vessels equipped with a far more versatile manipulator system, capable of performing diverse mechanical operations involving the handling and manipulation of a variety of tools, equipment and objects under water.

Furthermore, by reason of the constantly exposed, and thus unprotected, position of the manipulator apparatus in earlier devices, there was always the danger that the projecting appendage could be easily damaged upon sudden unexpected contact with the ocean bottom or with a hidden object while the vessel was submerging or moving under water.

The disclosed embodiment of the invention is in the form of a remotely-operated mechanical manipulator system mounted on the bottom of a submarine vessel for working on the ocean floor. The manipulator is comprised of a pair of highly articulated arm members branching from a common extensible T-section. A primary feature of this arrangement is found in the provision of a coarse control section in the extensible boom which positions the arms in the working area, and the provision of a fine control section in the arms themselves with their various articulations which can be controlled with precision because of their lower mass. This feature allows maximum work area without repositioning the vehicle. The basic assembly has the ability to be assembled from a few basic sections in many configurations, which is desirable, because different tasks require different arm configurations. This design also permits the entire manipulator assembly to be retracted into a protective compartment which prevents damage to the mechanism should the submarine collide unexpectedly with any obstacles while submerging or in transit. Also, by leaving the front hatches of the compartment open, it is feasible, after retraction of the mechanism into the protective enclosure, to operate the manipulator even though the bottom of the submarine is resting on the ocean floor.

Sufficient range and freedom of movement is provided by rotatable joint connections in the arms, and in the telescoping and pivoting of the T-section, to enable the manipulator to duplicate, if not surpass, the flexibility provided by the arm and wrist motions of the human body so that the operator can carry out a wide variety of complex tasks with the conjoint and separate use of the manipulator arms. The terminal end of each of the manipulator arms is provided with an associated hand element formed of a pair of self-aligning gripping pads which enables the mechanism to grasp objects and tools of various shapes and sides. Finally, a tool rack carrying a variety of special-purpose tools, such as drills, wrenches, cutters, saws, etc., is carried on the projecting end of the T-section so that the tools are readily accessible to the gripping hand of either of the manipulator arms.

It is therefore a principal object of the present invention to provide a new and versatile mechanical manipulator for a submersible marine vessel which is capable of performing a large variety of operations under water.

It is a principal feature of the present invention to provide a new and improved mechanical manipulator system for a submersible marine vessel which includes a tool rack containing a selection of tools and equipment which are available for use by the manipulator in performing various tasks under water.

It is another principal feature of the present invention to provide a mechanical manipulator system for a submersible marine vessel which is retractable within a protective compartment when the marine vessel is near to or resting on the marine bottom, and which is stowable in the compartment when the vessel is submerging or in transit.

The foregoing and other objectives, features and advantages of the present invention will be more readily understood upon consideration of the following detailed description of the invention, taken in conjunction with the accompanying drawings.

Figure 1:
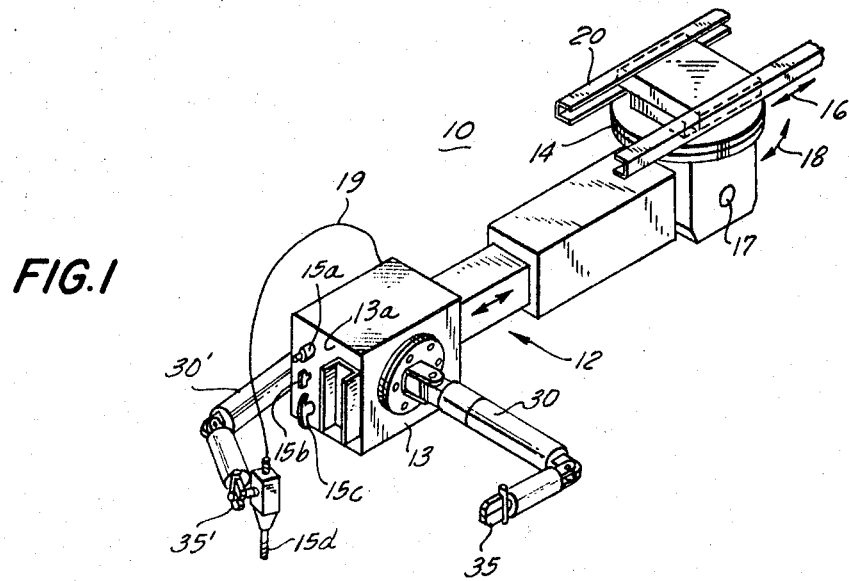
FIG. 1 is a perspective view of the manipulator apparatus of the present invention in operation.

Referring to the drawings, there is shown in FIG. 1 an illustrative embodiment of an underwater mechanical manipulator, designated generally as 10, adapted for use with a submersible marine vessel. The manipulator comprises an extensible, telescoping T-section 12 which is secured at one end by a rotary joint 14 to a sliding track 20 in the base of a marine vessel, in a manner so as to permit rectilinear and rotary movement of the section 12 as shown by the arrows 16 and 18, respectively. The projecting end of the T-section 12 terminates in a box-shaped element 13 from the sides of which branch a pair of articulated arm members 30 and 30' with associated gripping hand elements 35, 35'. The construction of the individual manipulator arms may be done by means known in the art, as, for example, shown in the U.S. patents to Froelich, 3,104,641, or Bodey, 3,229,656. The front face 13a of the box 13 is in the form of a tool rack carrying a variety of special-purpose tools 15a, 15b, 15c, and 15d adapted for underwater use. As shown in FIG. 1, the left-hand manipulator arm 30' is handling and working with a typical tool 15d in the form a power drill which may be electrically, pneumatically, hydraulically, or mechanically powered by a power supply (not shown) carried aboard the marine vessel and connected to the tool by various means, for example, over the conduit 19, which may be electric or hydraulic, or through the arm 30 itself. A mechanical drive shaft may also be provided in the arm, which can be utilized to power external tools and devices. The mechanical drive feature allows a tool to be engaged and disengaged without the hazard of contamination to the hydraulic system. In this fashion a selection of various types of manual and power tools may be carried in the tool rack 13a on the T-section 12 in a position where they are readily accessible for removal, use and return by either of the manipulator arms 30 and 30'.

Figure 2:
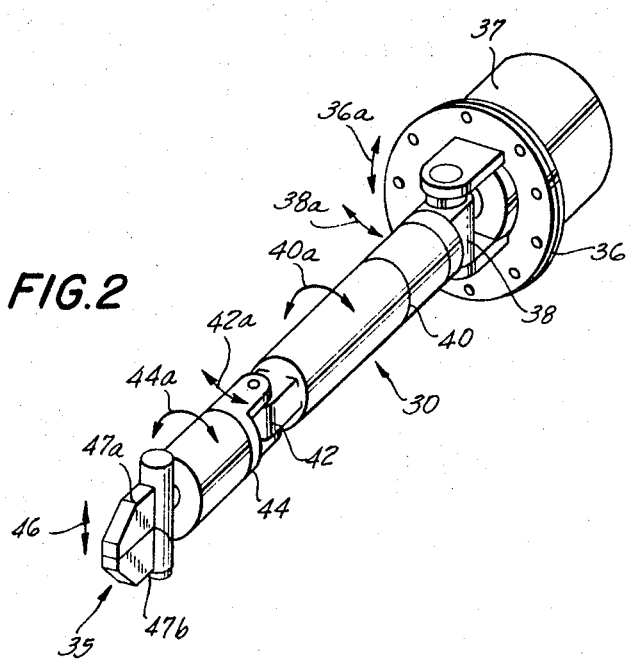
FIG. 2 is a detailed view of one of the arms of the manipulator showing the articulations and movements available.

FIG. 2 shows an exemplary form of articulated arm member 30 which may be advantageously used in the manipulator assembly of the present invention. At the shoulder 37 where the arm connects to the side of the terminal end of the T-section, and along the length of the member, a plurality of pivoting and rotary joints located, respectively, at 36, 38, 40, 42 and 44 provide a wide degree of flexibility and range of movement, as shown by the associated arrows 36a, 38a, 40a, 42a and 44a, so that the manipulator arm may be moved and twisted into virtually any position required. The actuation of the respective joints for each of the manipulator arms 30, 30' may be effected in any suitable manner through known electrical, pneumatic or hydraulic means operated from a remote location under the control of an operator located inside the marine vessel. By way of example, the manipulator arms may be separately actuated by prosthetic control mechanisms similar to those presently used in the handling of radioactive and nuclear materials. It will be understood that the particular mechanism used for actuating and controlling the movements of the manipulator arms forms no part of the present invention, and that any suitable means may be used for this purpose.

The hand portion 35 of the manipulator arm 30 may be in the form, as shown in FIG. 2, of a pair of self-aligning gripping pads 47a, 47b which, under controlled actuation, may be adjustably separated and brought together, as indicated by the arrow 46, to provide a vise-like action. It may be preferable to provide in the circuitry actuating the hand member 35 a suitable feedback control loop which would enable the operator to obtain a "feel" of the gripping pressure generated by the pads 47a, 47b in the grasping of objects and tools. An exemplary system for actuating and controlling a gripping hand member of this type is disclosed in a copending application of Raymond L. Colechia, Ser. No. 644,518, filed June 8, 1967, and assigned to the assignee of the present application.

Figure 3:
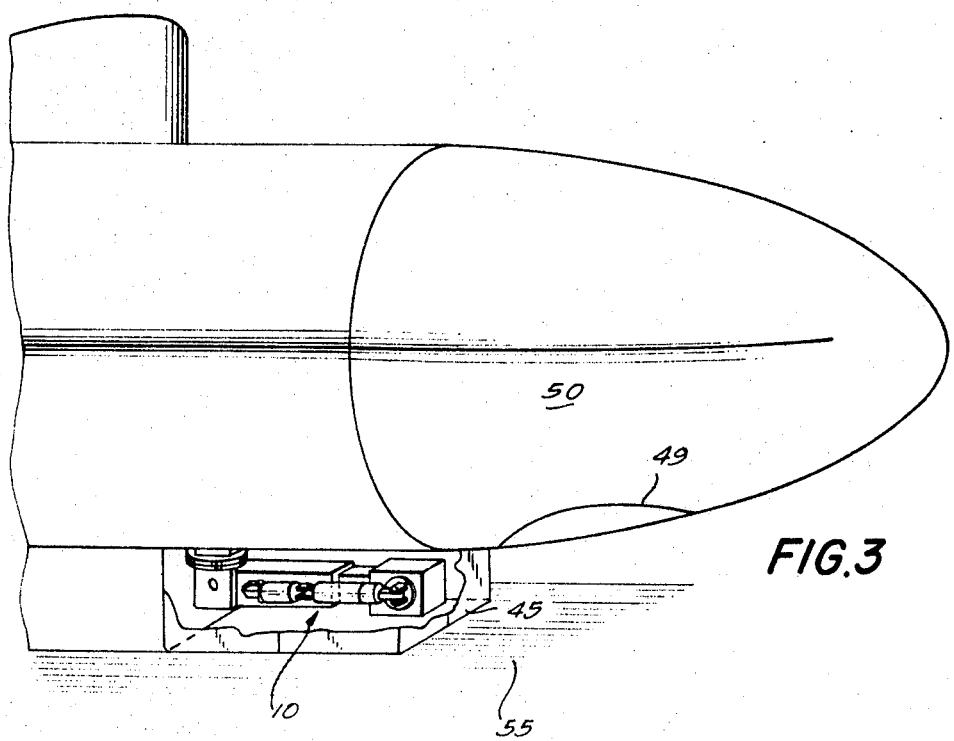
FIG. 3 is a partial perspective view of a typical submarine vessel outfitted with the manipulator of the present invention, a portion of the protective compartment being broken away to show the manipulator in its stowed position.

FIGS. 3-8 are a selection of views of the manipulator system of the present invention mounted on the keel of a submarine vessel and showing the manipulator in various positions of stowage, semi and full extension, and in operation. Referring initially to FIG. 3, the manipulator 10 is shown stowed within a protective compartment 45 carried on the bottom of the submarine 50. In this retracted stowage position inside the compartment 45, the manipulator assembly is protected from the possibility of damage arising from collision or sudden contact by the submarine keel with either the marine floor, illustrated at 55, or with other submerged objects.

Figure 4:
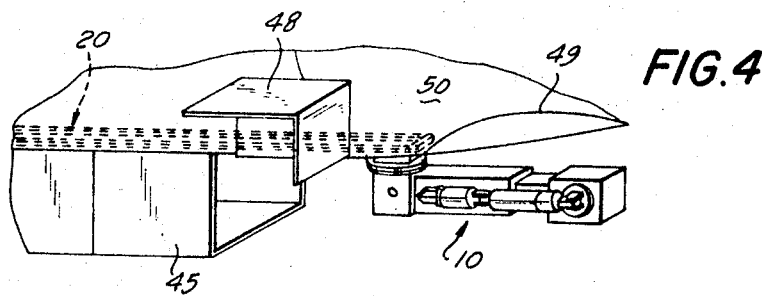
FIG. 4 is a perspective view showing the manipulator removed from the compartment and in position for operation.
Figure 5:
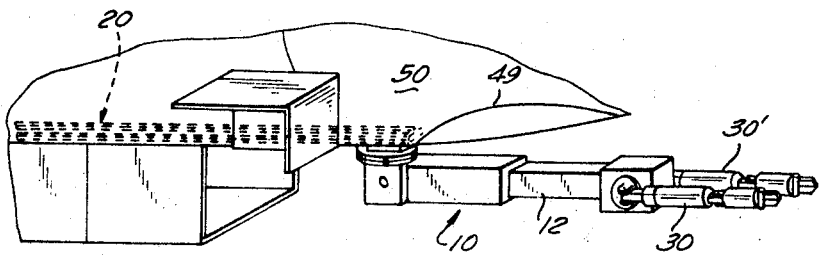
FIG. 5 is a perspective view showing the manipulator in a fully-extended forward position.

After the submarine has reached the work area where operations are to be carried out, and is maintaining a stationary position, the front hatch covers 48 of the protective compartment 45 are opened by a suitable powered mechanism (not shown) and, as shown in FIG. 4, the manipulator assembly 10 is moved outside the protective enclosure, riding forward on track 20 until the assembly comes into sight of the viewing port 49 where its movements can be observed by an operator, either directly or remotely via a closed-circuit television system. As then shown in FIG. 5, the manipulator assembly 10 is next extended forward by the telescoping action of the T-section 12, and the arms 30, 30' brought away from their folded position shown in the previous figure and extended forward into a position where the hands can be seen by the operator.

Figure 6:
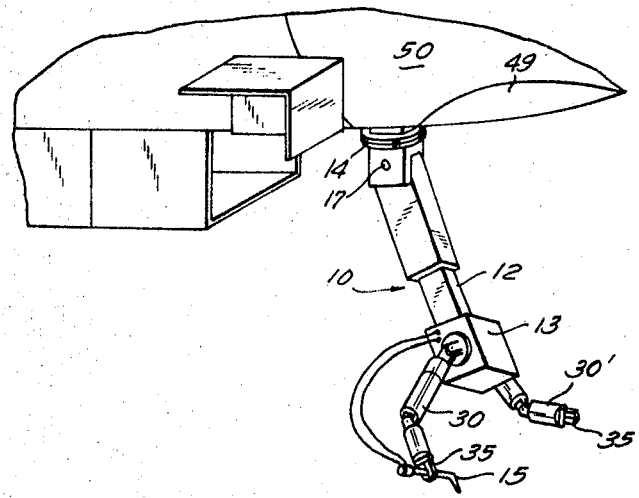
FIG. 6 is a perspective view showing the manipulator working with tools in a downward extended position.

Thereafter, under the control of the operator, one or both of the hands 35 would be actuated to grasp a selected tool 15 from the tool rack carried on the box section 13, and the manipulator, as shown in FIG. 6, would then be extended and rotated as required to bring it into the desired position in the working area.

Figure 7:
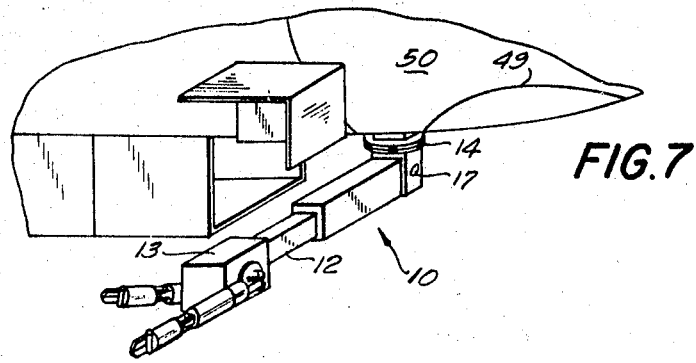
FIG. 7 is a perspective view showing the manipulator in a fully-extended lateral position.

FIG. 7 shows the manipulator assembly 10 fully extended in a lateral horizontal position and illustrates the wide area which the manipulator can cover while the marine vessel is maintained in a fixed position. The combination of the horizontal arc adjustment provided by the rotary joint 14, the vertical arc adjustment provided by the pivot joint 17, and the radial adjustment provided by the extensible section 12, enables the manipulator to range over, and to work effectively, at any point within an area corresponding to an entire quarter portion of a sphere.

Figure 8:
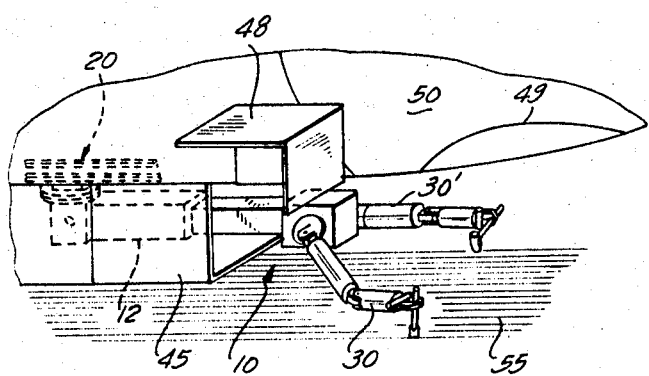
FIG. 8 is a perspective view showing the manipulator in the retracted position for operation when the submarine vessel is resting on bottom.

Finally, FIG. 8 shows the manipulator 10 in a position suitable for working when the keel of the marine vessel 50 is resting on the ocean floor 55. In this situation the manipulator assembly 10 is retracted back on track 20 to a position inside the protective compartment 45 which is in contact with the ocean floor. However, the front hatches 48 are left open so as to permit the T-section 12 to extend forward and the arms 30, 30' to remain out in the open water and in sight of the viewing port 49, thus allowing the operator to use the manipulator to perform work directly beneath the vessel while it rests on the ocean floor.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A manipulating device for doing undersea work outside a submarine, comprising:
    an extensible trunk connected at one end to said submarine, and having its other end telescopically extensible from said connected end;
    a pair of arms attached to said trunk at said other end, each arm having articulations for movement with respect to said other end;
    a track on the outer surface of said submarine, in which said trunk is slidably connected; and
    a pair of devices attached to said arms at their outer ends for performing undersea work.

2. A manipulating device as recited in claim 1, further comprising a housing attached to the outer surface of said submarine and surrounding said trunk and arms when said trunk is at one end of said track.

3. A manipulating device as recited in claim 1, wherein said trunk is rotatable at said track around an axis perpendicular to said surface at said track.

4. A manipulating device as recited in claim 1, wherein said trunk is rotatable at said track around an axis parallel to said surface at said track.

References Cited

UNITED STATES PATENTS 3,043,448  7/1962  Melton _____ 214—1

FOREIGN PATENTS 1,310,377  10/1962  France.
859,162  1/1961  Great Britain.

OTHER REFERENCES

General Mills, "Vehicular Mechanical Arm Systems," Nov. 11, 1960, page 2 relied upon.

Armed Services Technical Information Agency, "Survey of Remote Handling in Space," September 1962; pages 8 and 9 relied upon.

REINALDO P. MACHADO, *Primary Examiner.*

J. KARL BELL, *Assistant Examiner.*

U.S. Cl. X.R.

114—16; 214—1